(12) United States Patent
Kimura et al.

(10) Patent No.: US 9,070,384 B1
(45) Date of Patent: Jun. 30, 2015

(54) PERPENDICULAR MAGNETIC RECORDING WRITE HEAD WITH PLATE HAVING COIL REGIONS AND HEAT-SINK REGIONS

(71) Applicant: HGST Netherlands B.V., Amsterdam (NL)

(72) Inventors: Wataru Kimura, Fujisawa (JP); Akira Morinaga, Chigasaki (JP); Shigeru Tadokoro, Odawara (JP); Hideaki Tanaka, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/532,613

(22) Filed: Nov. 4, 2014

(51) Int. Cl.
*G11B 5/127* (2006.01)
(52) U.S. Cl.
CPC .................................... *G11B 5/1278* (2013.01)
(58) Field of Classification Search
CPC ...... G11B 5/1278; G11B 5/3123; G11B 5/17; G11B 5/315; G11B 5/3116
USPC .................................................... 360/123.06
See application file for complete search history.

(56) References Cited

U.S. PATENT DOCUMENTS

| | | | |
|---|---|---|---|
| 8,077,559 B1 * | 12/2011 | Miyauchi et al. | 369/13.33 |
| 8,270,791 B2 * | 9/2012 | Komura et al. | 385/37 |
| 8,786,973 B2 * | 7/2014 | Oikawa | 360/59 |

* cited by examiner

*Primary Examiner* — Wayne Young
*Assistant Examiner* — Mark Blouin
(74) *Attorney, Agent, or Firm* — Thomas R. Berthold

(57) ABSTRACT

A magnetic recording write head has a continuous electrically conductive plate with an aperture, a coil region around the aperture and heat-sink regions spaced from the coil region. A yoke stud is located in the aperture and connects the upper yoke layer to the main pole. The plate with the aperture replaces the multi-turn coil of the prior art and thus allows for a short yoke height. Write current is directed to the plate coil region and induces a magnetic field in the aperture, which generates magnetic flux in the yoke stud and the connected main pole. The heat-sink regions dissipate heat generated in the plate by the write current. A lower electrical lead layer is located below the plate and also has an aperture coincident with the aperture in the plate and a coil region around the aperture to assist in generating the magnetic field in the aperture.

15 Claims, 9 Drawing Sheets

_PERPENDICULAR MAGNETIC RECORDING WRITE HEAD WITH PLATE HAVING COIL REGIONS AND HEAT-SINK REGIONS_

BACKGROUND OF THE INVENTION

1. Field of the Invention

This invention relates generally to perpendicular magnetic recording systems, and more particularly to perpendicular magnetic recording write heads for use in magnetic recording disk drives.

2. Description of the Related Art

In a perpendicular magnetic recording system like a magnetic recording hard disk drive, the recorded bits are stored in a perpendicular or out-of-plane orientation in the recording layer. The recording or write head in perpendicular magnetic recording disk drives is a set of patterned thin films on the trailing surface of an air-bearing slider that has an air-bearing surface (ABS) that faces the recording layer on the disk. The write head includes a main pole with a tip at the ABS, a magnetic yoke connected to the main pole, an electrically conductive write coil with multiple turns through the yoke, and one or more return poles for return of magnetic flux from the recording layer.

As the data rate increases in magnetic recording systems, it is desirable for the write head to have a short yoke, i.e., a yoke with a small height as measured from the ABS, in order to minimize the time for the magnetic flux to travel to the pole tip. However, the amount of reduction in the height of the yoke is limited by the requirement for a certain number and size of coil turns in the yoke.

The write current through the coil also generates heat, which causes undesirable pole tip protrusion. One approach to address this problem is to add separate thermally conductive heat sink layers near the coil to dissipate the heat. However, this increases the complexity of the write head fabrication process.

What is needed is a write head that enables a reduction in yoke height and dissipates heat to reduce pole tip protrusion.

SUMMARY OF THE INVENTION

Embodiments of this invention relate to a magnetic recording write head with a continuous electrically conductive plate with at least one aperture, a coil region around the aperture and heat-sink regions spaced from the coil region. A yoke stud is located in the aperture and connects the upper yoke layer to the main pole. The plate with the aperture replaces the multi-turn coil of the prior art and thus allows for a short yoke height. Write current through the plate is directed to the coil region and induces a magnetic field in the aperture, which generates magnetic flux in the yoke stud and the connected main pole. The heat-sink regions are spaced from the coil region and experience substantially no current flow when write current is applied to the plate, but dissipate heat generated in the plate by the write current. A lower electrical lead layer is located below the plate and also has an aperture coincident with the aperture in the plate and a coil region around the aperture. When write current passes between the lower lead and the plate the current in the lead coil region assists in generating the magnetic field in the aperture.

For a fuller understanding of the nature and advantages of the present invention, reference should be made to the following detailed description taken together with the accompanying figures.

DETAILED DESCRIPTION OF THE INVENTION

Figure 1:
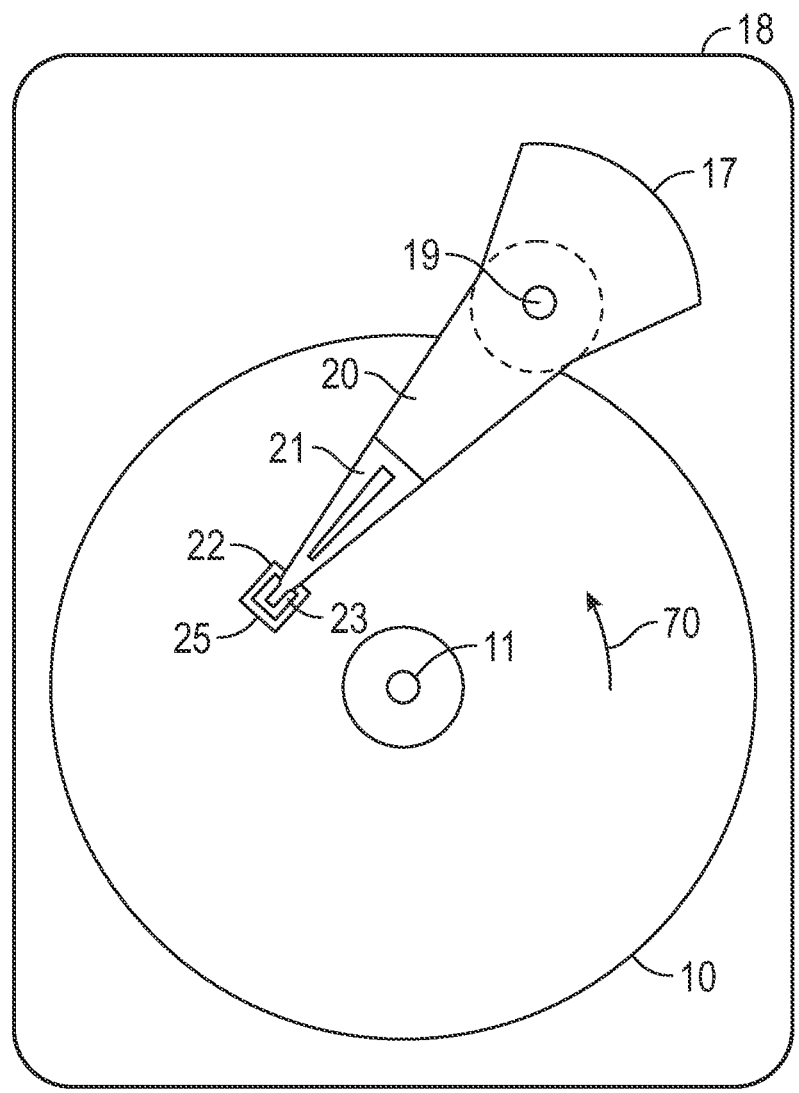
FIG. 1 is a schematic top view of a conventional magnetic recording hard disk drive with the cover removed.

FIG. 1 is a block diagram of a conventional magnetic recording hard disk drive with the cover removed according to the prior art. The disk drive includes a magnetic recording disk 10 and a rotary voice coil motor (VCM) actuator 17 supported on a disk drive housing or base 18. The disk 10 has a magnetic recording layer (RL) with generally concentric data tracks. The disk 10 has a center of rotation 11 and is rotated in direction 70 by a spindle motor (not shown) mounted to base 18. The actuator 17 pivots about axis 19 and includes a rigid actuator arm 20. A generally flexible suspension 21 includes a flexure element 23 and is attached to the end of arm 20. A head carrier or air-bearing slider 22 is attached to the flexure 23. A magnetic recording read/write head (not shown) is formed on the trailing surface 25 of slider 22. The flexure 23 and suspension 20 enable the slider to "pitch" and "roll" on an air-bearing generated by the rotating disk 10. Typically, there are multiple disks stacked on a hub that is rotated by the spindle motor, with a separate slider and read/write head associated with each disk surface.

Figure 2:
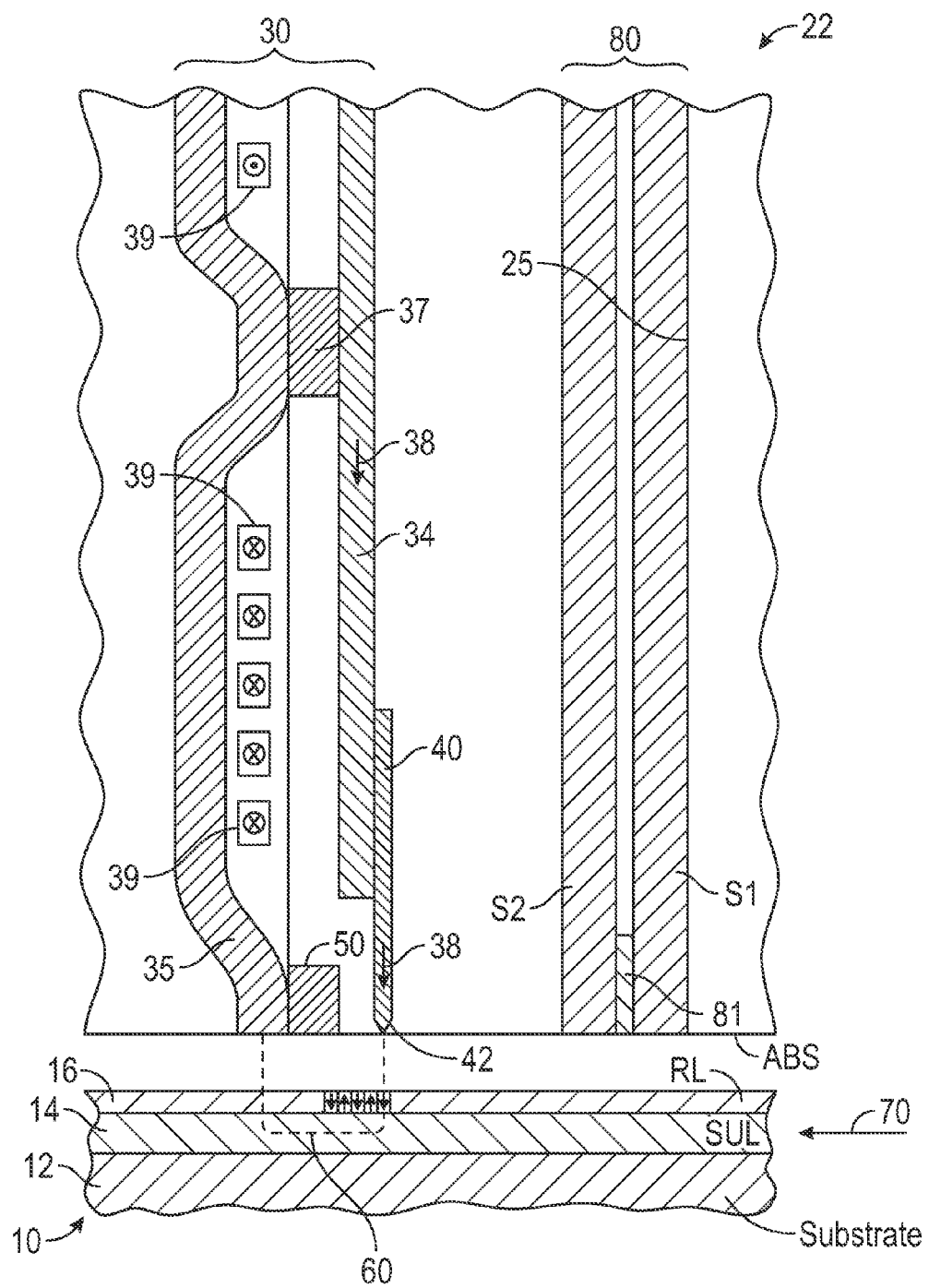
FIG. 2 is a side sectional view of a prior art perpendicular magnetic recording system showing a read head, a write head, and a recording medium taken through a plane parallel to a data track.

FIG. 2 is a side sectional view of a portion of the slider 22 showing a read head 80, a write head 30, and the recording medium (disk 10) with RL 16 taken through a plane parallel to a data track. As shown in FIG. 2, a "dual-layer" medium 10 includes a perpendicular magnetic data recording layer (RL) 16 on a "soft" or relatively low-coercivity magnetically permeable underlayer (SUL) 14 formed on the disk substrate 12. This type of medium is shown with a magnetoresistive (MR) read head 80 and a single pole type of recording or write head 30 that are shown in a section taken through a plane parallel with a data track on RL 16. The MR read head 80 includes the MR sensor 81 located between MR shields S1, S2.

The write head 30 includes a yoke made up of the main pole 34, a flux return pole 35, a yoke stud 37 connecting the main pole 34 and return pole 35, and a thin film coil 39 shown with the multiple coil turns shown in section. The X's in the lower coil sections indicate current into the plane of the paper and the circles in the upper coil sections indicate current out of the plane of the paper. The coil 39 is depicted as a well-known "pancake" coil wherein the coil 39 is wrapped around the yoke stud 37 and the coil segments lie in substantially the same plane. The main pole 34 includes a write pole 40 with a tip 42. Write current through coil 39 generates magnetic flux (shown by arrows 38 and dashed line 60) from the main pole 34 that passes from the pole tip 42 through the RL 16 to magnetize the region of the RL 16 beneath the pole tip 42. The magnetic flux is directed from the RL 16 through the flux return path provided by the SUL 14, and back to the return pole 35. The write current through the coil not only generates the magnetic field in the main pole but also generates heat, which causes undesirable protrusion of the pole tip 42 at the ABS.

The read head 80 and write head 30 are formed as a series of films deposited and patterned on the trailing surface 25 of slider 22, as is well known in the art. Slider 22 has an air-bearing surface (ABS) that is substantially orthogonal to the trailing surface 25 and that faces the disk 10. The pole tip 42 is located substantially at the ABS, and the return pole 35 has an end located substantially at the ABS. In FIG. 2 the disk 10 moves past the write head 30 in the direction indicated by arrow 70. The RL 16 is illustrated with perpendicularly recorded or magnetized regions, with adjacent regions having opposite magnetization directions, as represented by the arrows. The magnetic transitions between adjacent oppositely directed magnetized regions are detectable as resistance changes by the MR sensor 81 as the recorded bits. FIG. 2 also illustrates an optional trailing shield 50 at the ABS between the pole tip 42 and the end of return pole 35.

Figure 3:
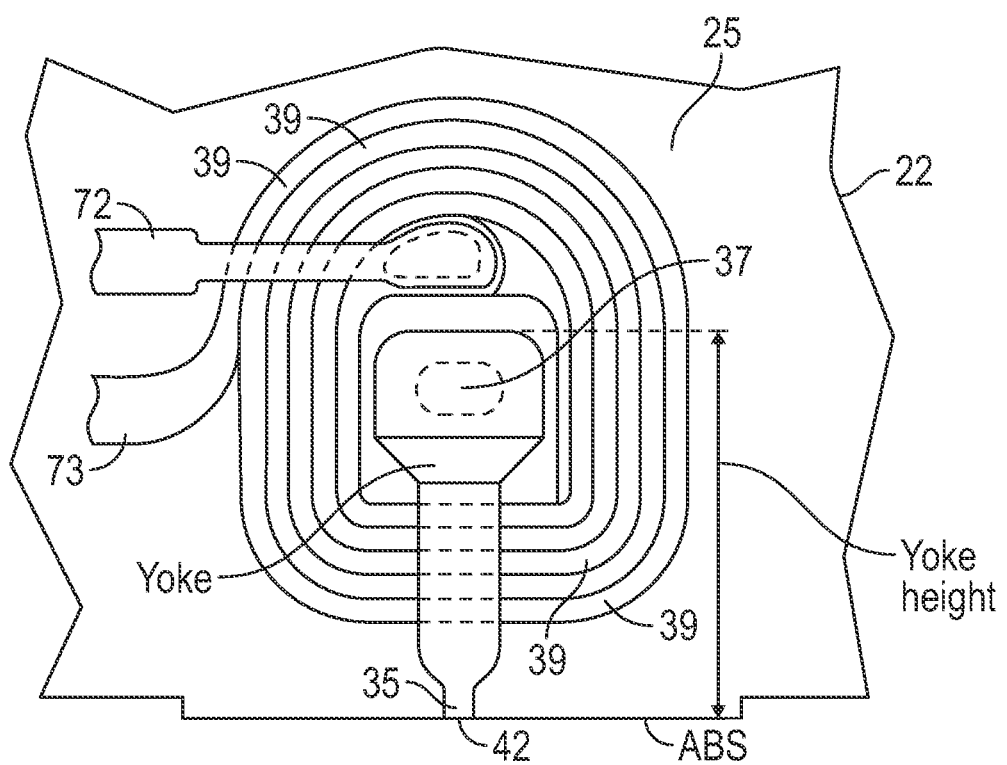
FIG. 3 is a plan view of a prior art write head on the trailing surface of a slider.

FIG. 3 is a plan view of the write head 30 on the trailing surface 25 of slider 22. The coil has multiple turns 39 that surround the yoke stud 37 located inside the yoke. Electrical leads 72, 73 make connection to the ends of the coil 39. FIG. 3 shows the yoke height as measured from the ABS. The requirement for a predetermined number of coil turns determines the yoke height. A tall yoke requires more time for the flux to travel to the pole tip. Thus a short yoke is desirable to achieve a high data rate, i.e., a high rate at which the data bits can be recorded.

Embodiments of this invention relate to a write head with a continuous electrically conductive plate with at least one aperture and a coil region around the aperture that replaces the multi-turn coil of the prior art. This structure allows for a short yoke height. A yoke stud is located in the aperture and connects the upper and lower yoke layers. Write current through the plate is directed to the coil region and induces a magnetic field in the aperture, which generates magnetic flux in the yoke stud and the connected main pole. The plate includes heat-sink regions that are spaced from the coil region and that experience substantially no current flow when write current is applied to the plate, but dissipate heat generated in the plate by the write current. In some embodiments, a lower electrical lead layer is located below the plate and also has an aperture coincident with the aperture in the plate and a coil region around the aperture. When write current passes between the lower lead and the plate the current in the lead coil region assists in generating the magnetic field in the aperture.

Figure 4A:
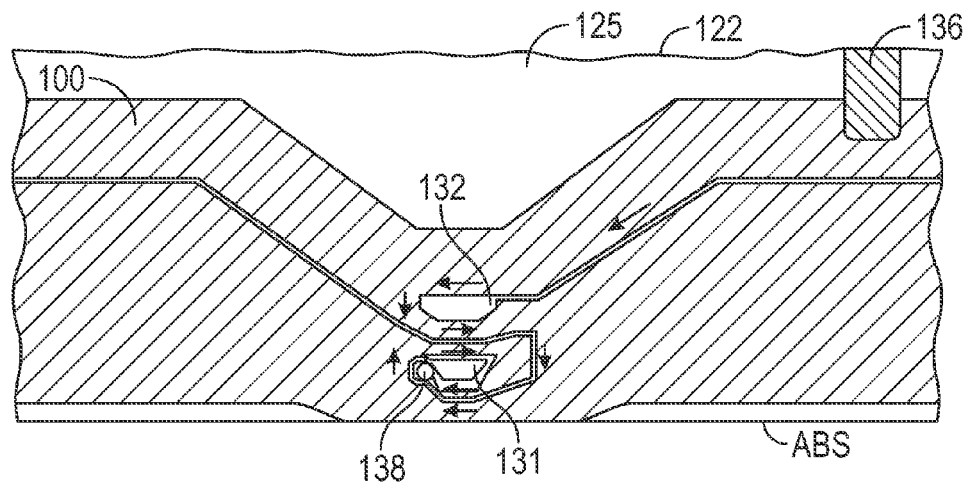
FIGS. 4A-4D are views of the electrically conductive plate and the lower lead layer of the write head according to an embodiment of the invention.

FIG. 4A is a plan view of the electrically conductive plate of the write head according to an embodiment of the invention. The plate 100, together with the yoke (not shown) is formed on the trailing surface 125 of slider 122 with its air-bearing surface (ABS). The plate includes two holes or apertures 131, 132. The arrows show write current from electrical lead 136 around aperture 132 and then aperture 131 to an electrically conductive via 138.

Figure 4B:
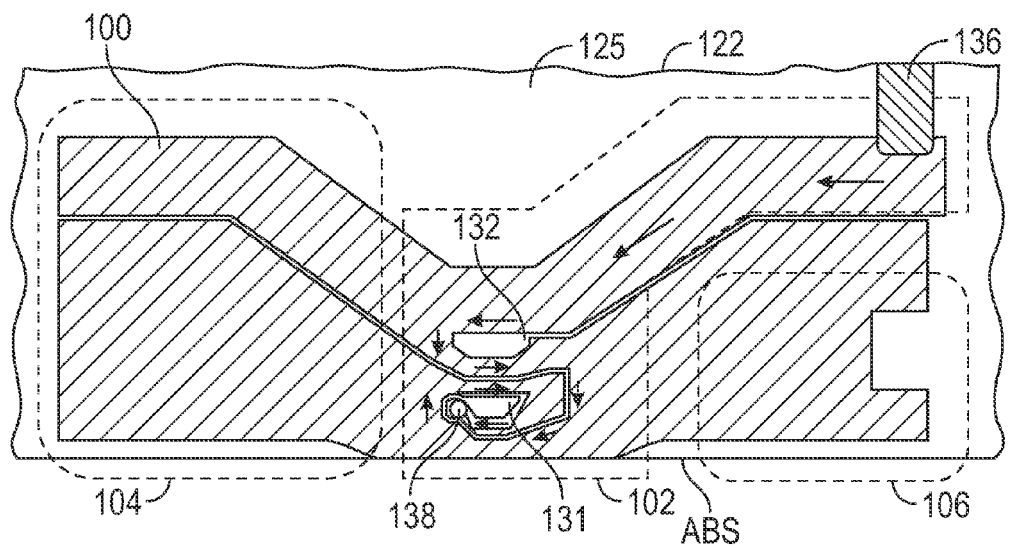
Figure 4C:
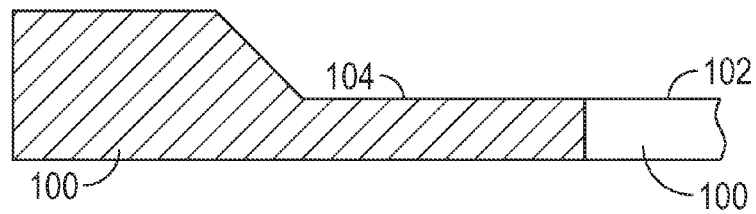

FIG. 4B shows the plate 100 with coil region 102 and heat-sink regions 104, 106. The plate 100 is preferably formed of copper (Cu). Computer modeling of current density has shown high current density in coil region 102 and substantially no current density in heat-sink regions 104, 106. Thus the single-piece plate 100 includes not only the coil region 102 that generates magnetic fields around apertures 131, 132, but also regions 104, 106 whose sole function is as a heat sink to absorb heat generated in the plate 100 by the write current to thereby minimize pole tip protrusion at the ABS. As shown in FIG. 4B, the heat-sink regions 104, 106 may be designed to have a larger surface area than the coil region 102. The plate 100 may have a uniform thickness in all regions with a thickness in the range of about 0.5 to 2.0 microns. Alternatively, the heat sink regions 104, 106 may be made thicker than the coil region 102 to increase their heat-sink capacity. This is shown in FIG. 4C where a portion of heat-sink region 104 is thicker than the coil region 102 of plate 100.

Figure 4D:
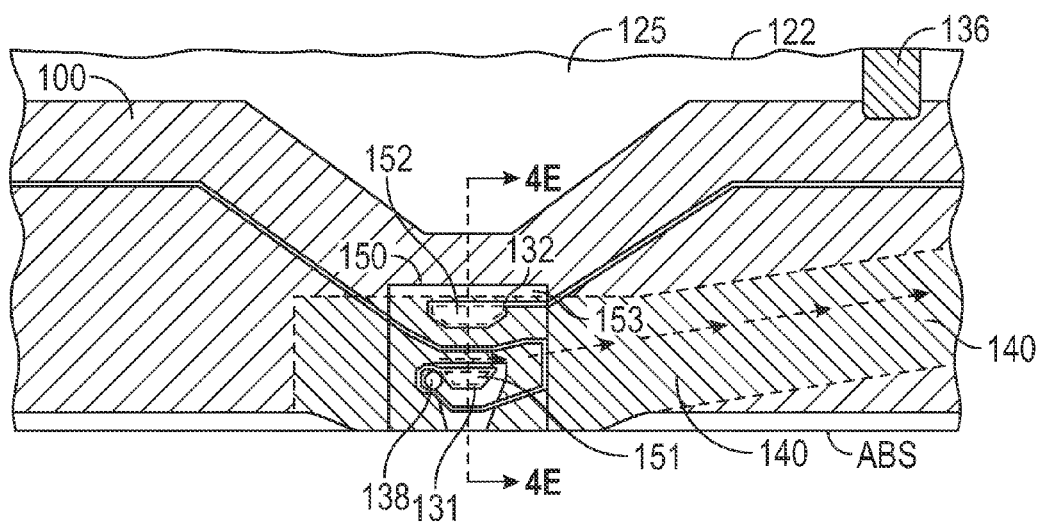

FIG. 4D shows a lower lead layer 140 in dashed lines located on trailing surface 125 below plate 100. Lower lead layer 140 is connected to via 138 and directs write current, as shown by the dashed arrows, to and from the plate 100 through via 138. The lower lead layer 140 is a continuous layer of electrically conductive material with an aperture that coincides with aperture 131. However current in lead 140 in this embodiment does not go around aperture 131. The direction of write current between lead 136 and lower lead layer 140 is selected based on the polarity of the bits being written to the recording layer. FIG. 4D also shows the upper layer of yoke 150 above plate 100 as well as yoke stud 151 located in aperture 131, yoke stud 152 located in aperture 132 and the yoke upper layer 153.

Figure 4E:
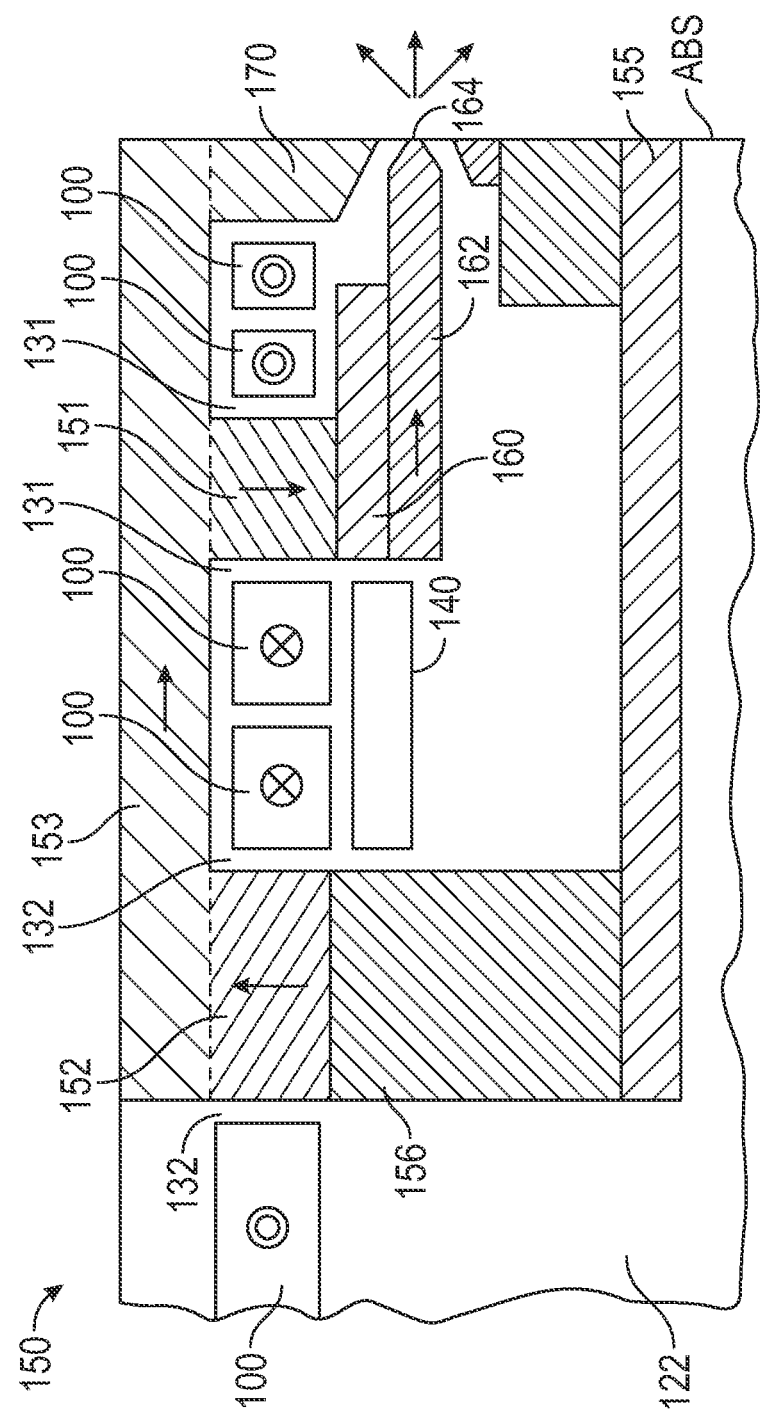
FIG. 4E is a view of section 4E-4E of FIG. 4D illustrating the yoke of the write head according to an embodiment of the invention.

FIG. 4E is a sectional view through section 4E-4E of FIG. 4D and shows the yoke 150, sections of electrically conductive plate 100 and lower lead layer 140. The yoke 150 includes lower layer 155 which may function as a return pole, upper layer 153, main pole 160, yoke studs 151, 152 located in plate apertures 131, 132, respectively, and back gap 156 that connects lower and upper yoke layers 155, 153. The main pole 160 includes write pole 162 with tip 164 at the ABS. Yoke stud 151 connects the upper yoke layer 153 with the main pole 160 and thus with write pole 162. The write pole 162 and main pole 160 are also connected to yoke stud 152 through the upper yoke layer 153. An optional trailing shield 170 may be connected to upper layer 153. The yoke layers 153, 155, studs 151, 152 and back gap 156 are typically formed of soft ferromagnetic material, such as alloys of NiFe, CoFe and NiFeCo. The main pole 160, sometimes also called the "stitched" pole", is typically formed of a NiFe alloy, and the write pole 162 is typically formed of a high-moment ferromagnetic material, such as a high-moment NiCoFe alloy. When write current is generated in plate 100, as shown by the circles and X's in the plate 100 sections, magnetic flux is generated in yoke 150, as shown by the solid arrows, which is directed to pole tip 164.

A shown in FIG. 4D the lower lead layer 140 is a continuous layer without any insulating barriers and thus current can flow directly into via 138 or directly out of via 138 without making a turn at aperture 131. Thus the current in lead 140 is not directed around aperture 131 and thus does not generate any substantial flux in yoke stud 151. This is shown in FIG. 4E where only the coil sections of plate 100 generate the magnetic flux in yoke studs 151, 152, with the lower lead 140 functioning as only an electrical lead.

Figure 5A:
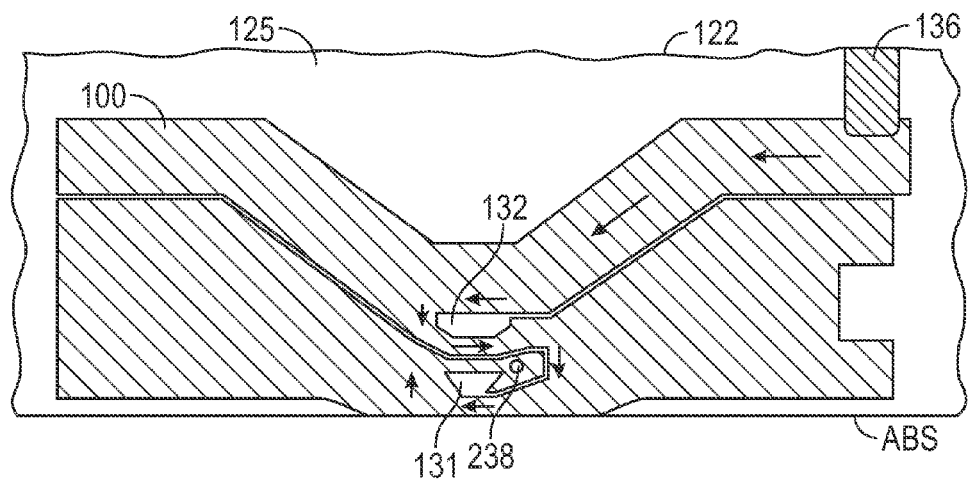
FIGS. 5A-5B are views of the electrically conductive plate and the lower lead layer of the write head according to an embodiment of the invention wherein the lower lead layer also functions to generate a magnetic field.
Figure 5B:
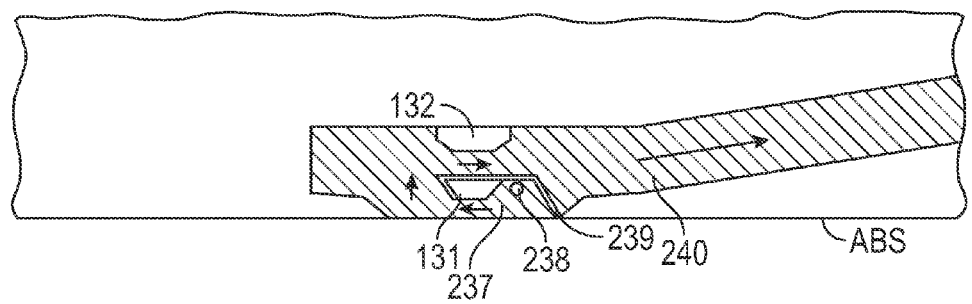

FIGS. 5A-5B illustrate an embodiment wherein the lower lead layer also functions to generate magnetic flux. FIG. 5A is a view of plate 100 and FIG. 5B is a view of a lower lead layer 240 wherein the lower lead layer 240 also has a coil region 237 and thus also functions to generate a magnetic field in aperture 131. The electrically conductive via 238 directs current between upper plate 100 and lower lead layer 240. In lower lead layer 240 the current is required to travel around aperture 131 due to the insulating barrier 239.

Figure 6:
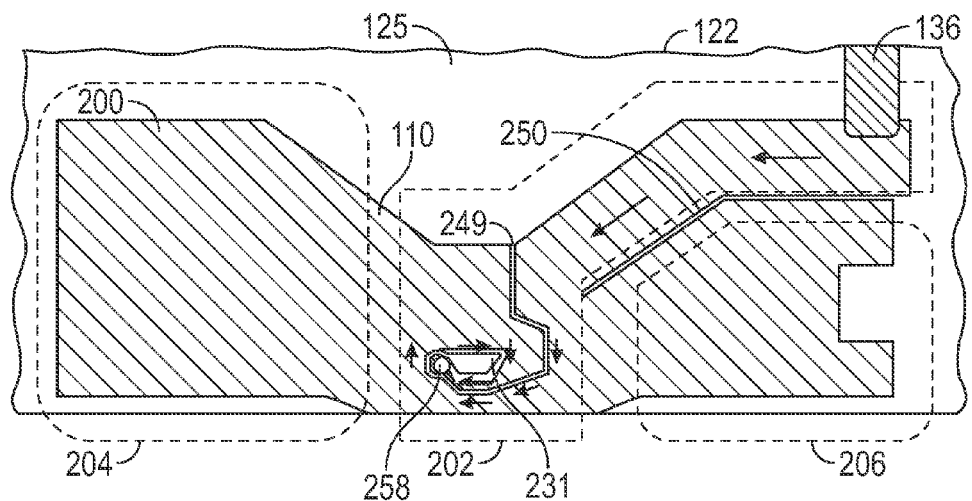
FIG. 6 is a view of the electrically conductive plate of the write head according to another embodiment of the invention wherein the plate includes only one aperture.

FIG. 6 is a view of an electrically conductive plate 110 according to another embodiment of the write head of this invention. The plate 110 includes only one aperture 231 and has insulating barriers 249, 250 which cause the write current to pass from lead 136 in the direction shown by the arrows around aperture 231 to via 258. Thus plate 110 has a coil region 202 and heat-sink regions 204, 206. Like the embodiment of FIG. 4A, the embodiment of FIG. 6 may use a continuous lower lead layer that does not contribute to the magnetic field around aperture 231 but acts only as an electrical lead (as shown in FIG. 4D), or a lower lead layer with a coil region that directs current around aperture 231 to increase the magnetic field in aperture 231 (as shown in FIG. 5B). While the plate-shaped coil in embodiments of this invention provide a shorter yoke than the prior art, the embodiment of FIG. 6 with only one aperture may provide a write head with an even shorter yoke than the embodiment of FIG. 4A with two apertures.

Figure 7A:
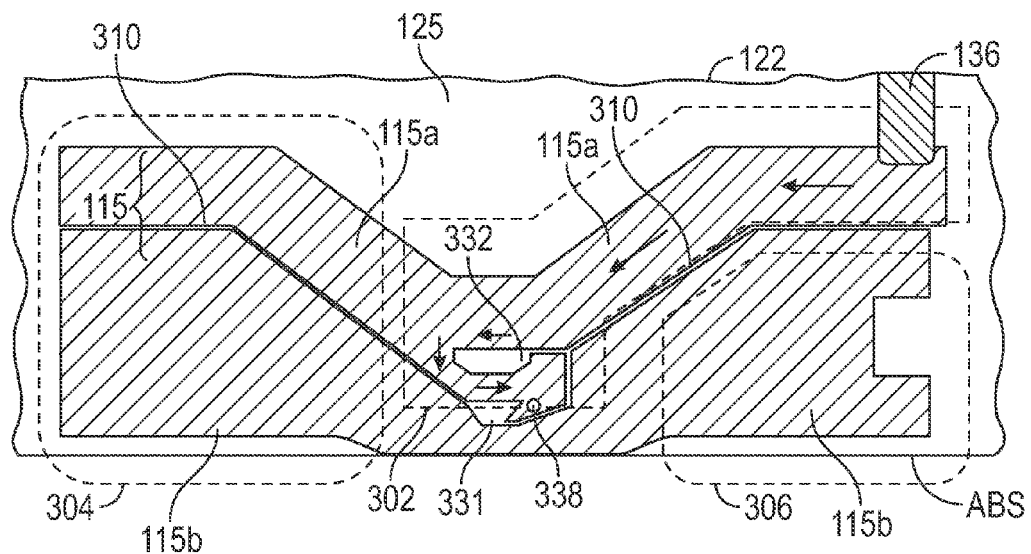
FIGS. 7A-7B are views of the electrically conductive plate and the lower lead layer according to another embodiment of the invention wherein the plate is separated into two portions.
Figure 7B:
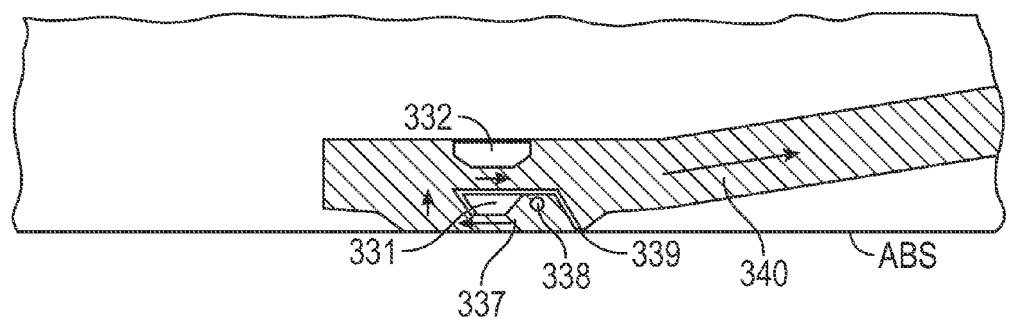

FIG. 7A is a view of plate 115 and FIG. 7B is a view of lower lead layer 340 according to another embodiment of the invention. In this embodiment only current in plate 115 generates the magnetic field in aperture 332 and only current in the lower lead layer 340 generates the magnetic field in aperture 331. Current does not travel in plate 115 around aperture 331 because plate 115 is separated into two portions 115a, 115b by insulating barrier 310. The insulating barrier 310 separates heat-sink region 306 in portion 115b from coil region 302 in portion 115a and the heat-sink region 304 in portion 115b from the coil region 302 in portion 115a. The lower lead layer 340 also has a coil region 337 and thus functions to generate a magnetic field in aperture 331. The electrically conductive via 338 directs current between upper plate 115 and lower lead layer 340. In lower lead layer 340 the current is required to travel around aperture 331 due to the insulating barrier 339.

Figure 8A:
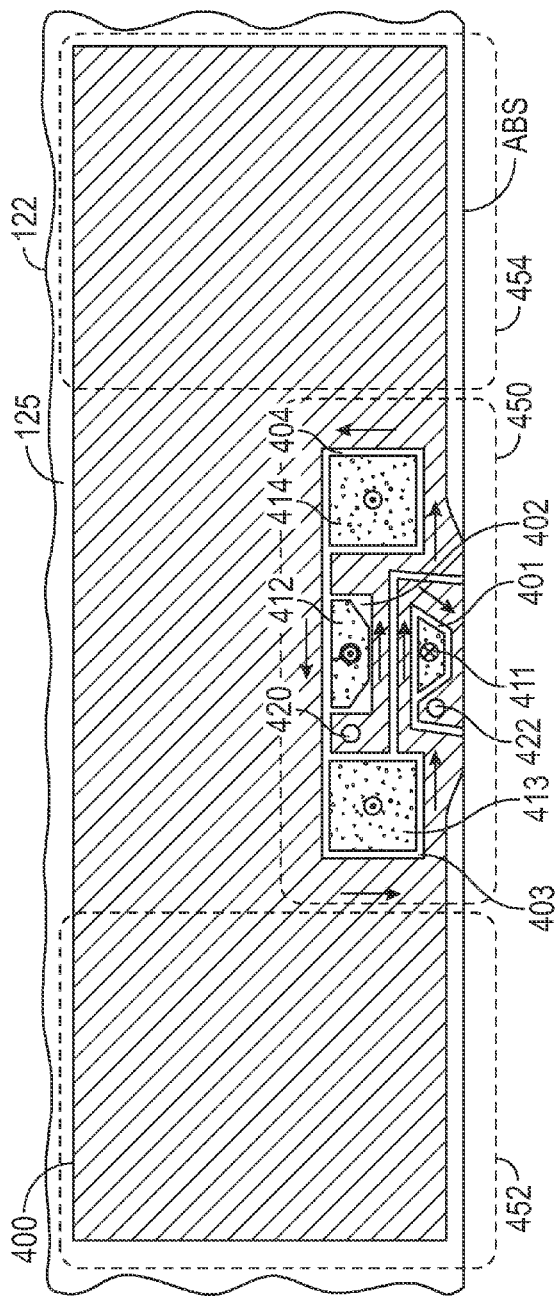
FIGS. 8A-8B are views of the electrically conductive plate and the lower leads according to another embodiment of the invention.
Figure 8B:
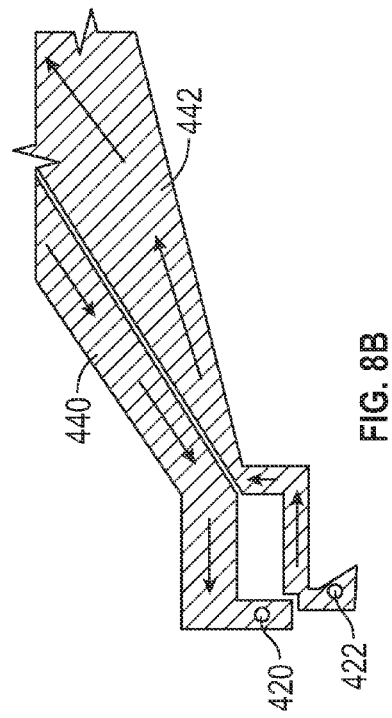

FIG. 8A is a view of electrically conductive plate 400 and FIG. 8B is a view of lower leads 440, 442 for another embodiment of the invention. In this embodiment both leads connected to the plate 400 are located on a lower layer below the plate 400. This embodiment shows that the invention may have more than two apertures, in this case four apertures 401-404 in plate 400. Plate 400 has a coil region 450 and heat-sink regions 452, 454. Yoke studs 411-414 are located within respective apertures 401-404. The arrows indicate the current from lead 440 to via 420 up to plate 400 and around the yoke studs 411-414 back to via 422 then down to lower lead 442. The circles and X's in the yoke studs 411-414 show the direction of the magnetic fields generated by the current shown by the arrows.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording write head for magnetizing regions of a magnetic recording layer comprising:
a substrate;
a magnetic yoke comprising a lower layer on the substrate, an upper layer, a first yoke stud connected to the upper layer, and a main pole connected to the first stud and having a tip for facing the recording layer;
an electrically conductive plate between the yoke upper and lower layers and having a first aperture, wherein said first stud is located within said first aperture, the plate having a first coil region near said first aperture and heat-sink regions spaced from said first coil region; and
first and second electrically conductive leads connected to the plate for conduction of electrical current to said first coil region around said first aperture to generate magnetic flux in said first stud and connected main pole.

2. The write head of claim 1 further comprising a second stud connecting the lower and upper yoke layers and connected to the main pole and a second aperture in said plate surrounding the second stud, and wherein the plate includes a second coil region near the second aperture.

3. The write head of claim 2 wherein the first and second leads are also for conduction of electrical current to said second coil region around said second aperture to generate magnetic flux in said second stud and connected main pole.

4. The write head of claim 2 wherein one of said leads is a lower lead located between the yoke lower layer and the plate and includes an aperture, and wherein said first stud is located within said lead aperture.

5. The write head of claim 4 further comprising an electrically conductive via between the plate and the lower lead, whereby when current is directed to the lower lead it passes around the aperture in the lower lead to thereby generate magnetic flux in the first stud and the connected main pole.

6. The write head of claim 1 wherein the plate heat-sink regions are electrically isolated from the plate first coil region, wherein one of said leads is a lower lead located between the yoke lower layer and the plate and includes an aperture, and further comprising a second stud connecting the yoke upper and lower layers and located within said lead aperture and an electrically conductive via between the plate and the lower lead, whereby when current is directed to the lower lead it passes around the aperture in the lower lead to thereby generate magnetic flux in the second stud and the connected main pole.

7. The write head of claim 1 wherein the thickness of the plate first coil region is substantially the same as the thickness of the plate heat-sink regions.

8. The write head of claim 1 wherein the plate heat-sink regions have a thickness greater than the thickness of the plate first coil region.

9. The write head of claim 1 wherein the surface area of the plate heat-sink region is greater than the surface area of the plate coil region.

10. A perpendicular magnetic recording write head for magnetizing regions of a magnetic recording layer comprising:
a slider having a trailing surface and an air-bearing surface (ABS) substantially orthogonal to the trailing surface for facing the recording layer;
a magnetic yoke comprising a lower layer on the trailing surface, an upper layer, a first yoke stud generally orthogonal to the trailing surface and connected to the upper layer, a second yoke stud generally orthogonal to the trailing surface and connecting the lower and upper layers and located farther from the ABS than the first stud, a main pole connected to the first and second studs and having a tip substantially at the ABS;
an electrically conductive plate between the yoke upper and lower layers and having a first aperture in which the first stud is located and a second aperture in which the second stud is located, the plate having coil regions near said apertures and heat-sink regions spaced from said coil regions; and first and second electrically conductive leads connected to the plate for conduction of electrical current to said coil regions around their associated apertures to generate magnetic flux in said studs and connected main pole.

11. The write head of claim 10 wherein said second lead is a lower lead located below said plate and having an aperture in which the first stud is located, and further comprising an electrically conductive via connecting the plate and the lower lead, whereby when current is directed to the lower lead it passes around the lower lead aperture to thereby generate magnetic flux in the first stud and connected main pole.

12. The write head of claim 10 wherein said first and second leads are lower leads located below said plate and further comprising a first via connecting the plate and the first lower lead and a second via connecting the plate and the second lower lead.

13. The write head of claim 10 wherein the thickness of the plate coil regions is substantially the same as the thickness of the plate heat-sink regions.

14. The write head of claim 10 wherein the plate heat-sink regions have a thickness greater than the thickness of the plate coil regions.

15. The write head of claim 10 wherein the surface area of the plate heat-sink regions is greater than the surface area of the plate coil regions.

* * * * *